March 29, 1949.  L. A. SKINNER ET AL  2,465,402
ROCKET LAUNCHER FIRING MECHANISM
Filed Sept. 25, 1943  2 Sheets-Sheet 1
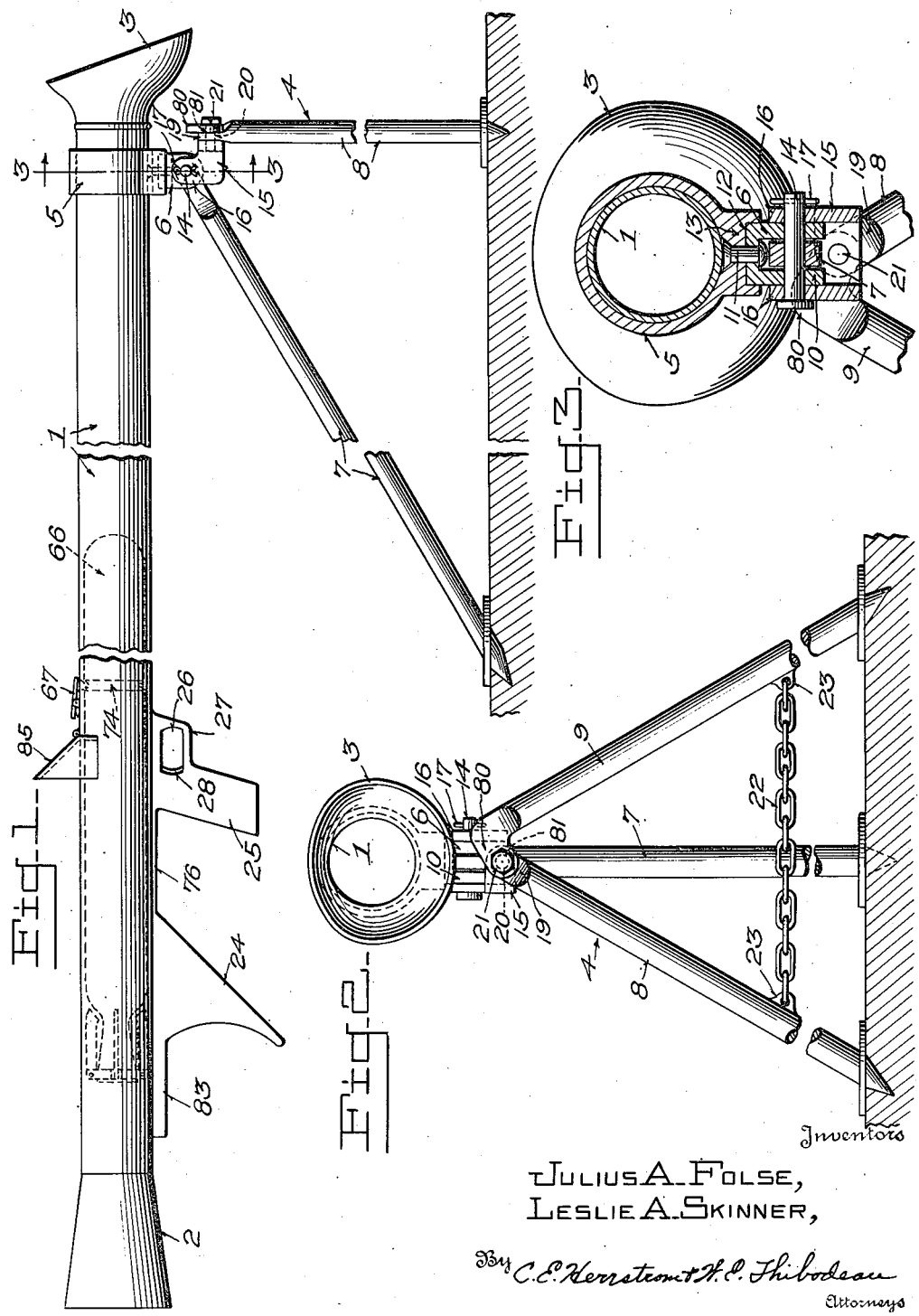
Inventors
Julius A. Folse,
Leslie A. Skinner, March 29, 1949. L. A. SKINNER ET AL 2,465,402
ROCKET LAUNCHER FIRING MECHANISM
Filed Sept. 25, 1943 2 Sheets-Sheet 2
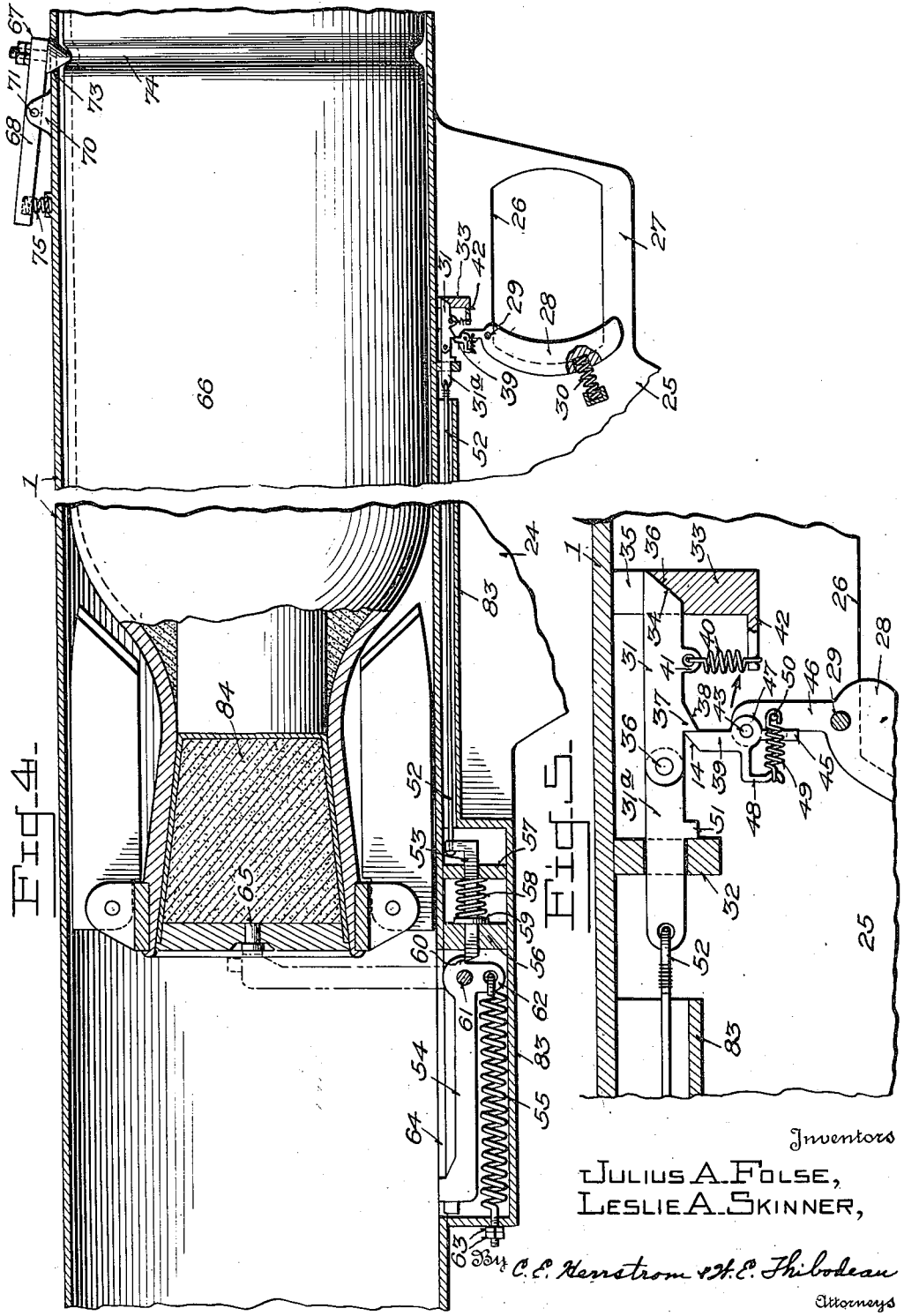
Inventors
Julius A. Folse,
Leslie A. Skinner, Patented Mar. 29, 1949

2,465,402

UNITED STATES PATENT OFFICE 2,465,402

ROCKET LAUNCHER FIRING MECHANISM

Leslie A. Skinner, Berkeley, Calif., and Julius A. Folse, Miami, Fla.

Application September 25, 1943, Serial No. 503,832

2 Claims. (Cl. 89—1.7)

(Granted under the act of March 3, 1883, as amended April 30, 1928; 370 O. G. 757)

The invention described herein may be manufactured and used by or for the Government for governmental purposes without the payment to us of any royalty thereon.

This invention relates to a rocket launcher, particularly to a rocket launcher for use by paratroopers.

It is an object of this invention to provide a rocket launcher, capable of projecting a large rocket of extreme destructive force, which may be easily and readily carried and operated by one man.

A further object of this invention is to provide an improved firing mechanism for a rocket launcher.

Another object of this invention is to provide a sturdy tripod support for a rocket launcher which may be collapsed against the launcher for carrying purposes.

Another object of this invention is to provide means for directing the reaction forces on the rocket launcher in such direction that the forces will be substantially absorbed by the support for the launcher and hence not disturb the operator.

The specific nature of the invention as well as other objects and advantages thereof will clearly appear from a description of a preferred embodiment as shown in the accompanying drawings in which:

Fig. 1 is a side elevational view of the rocket launcher showing the tripod secured to the muzzle end of the tube.

Fig. 2 is a front end elevational view of the rocket launcher shown in Fig. 1.

Fig. 3 is a transverse sectional view taken along the plane 3—3 of Fig. 1.

Fig. 4 is an enlarged fragmentary vertical sectional view of the rocket launcher, with a rocket in the firing position, showing the hammer, the trigger and the sear mechanisms in elevational view.

Fig. 5 is an enlarged view of a portion of Figure 4 disclosing details of the trigger and sear mechanism.

The rocket launcher to be described herein comprises mainly a hollow open-ended tube to which is attached a suitable combination shoulder stock rest and pistol grip. The muzzle end of the rocket launcher is adapted to be supported by a tripod which facilitates operation of the launcher by one man and aids in sighting the launcher. A funnel-shaped guide is secured to the rear end of the tube to facilitate loading the rocket into the rocket launcher tube. A reaction nozzle is provided on the muzzle of the rocket launcher to distribute the rearward thrust of the launcher onto the tripod support. A semi-automatic firing mechanism is provided for effecting the discharge of the rocket. The mechanism is arranged to be cocked by the gas blast of the rocket.

As shown in Fig. 1 the rocket launcher comprises a hollow tube 1 preferably constructed from thin sheet metal. A funnel-like guide 2 of sheet metal is welded to the rear end of tube 1, as shown in Fig. 1. The guide 2 also serves to more efficiently disperse the gas blast from a discharge rocket. A reaction nozzle 3 is welded to the muzzle end of tube 1. The nozzle 3 is cup-shaped and is eccentrically formed with respect to the axis of tube 1 so that a larger portion of the surface area of nozzle 3 is below the axis of tube 1. The purpose of displacing nozzle 3 in such manner about tube 1 is that a larger portion of the propulsion gases of the rocket will impinge on the lower end of nozzle 3 thereby producing a resultant rearward recoil force angularly directed towards the ground.

The muzzle end of tube 1 is supported on a tripod 4. Tripod 4 comprises a collar 5 which surrounds barrel tube 1, a swivel bracket 6, and three legs 7, 8, and 9. Collar 5 snugly surrounds tube 1, yet tube 1 may be adjusted longitudinally as desired within collar 5 in order to attain a position of maximum stability. The swivel bracket 6 has a cylindrical base and two integral depending lugs 10. The base of swivel bracket 6 is pivotally secured to collar 5 by a rivet 11. The base of swivel 6 is preferably inserted in a suitable recess 12 in the bottom of an integral lug 13 provided on the underside of collar 5. Tripod leg 7 is appreciably longer than legs 8 and 9 and is pivotally mounted between the bifurcated lugs 10 of bracket 6 by a headed pin 14 and extends rearwardly. An L-shaped bracket 15, having an upstanding bifurcated arm 16 is pivotally mounted on the extremities of pin 14. Pin 14 is secured against displacement by a cotter key 17.

The horizontal arm of bracket 15 is provided with a horizontal threaded hole to receive a bolt 21 on which are mounted legs 8 and 9. The leg 8 is provided with a suitably shaped lug 19 on the upper end thereof in which is provided a transverse hole 20 so that the leg 8 will pivot about the bolt 21 in a transverse plane. Leg 9 has a transverse projecting lug 80 at its top end, in which is provided a hole 81 by which leg 9 is mounted on bolt 21. A chain 22 secured to suitable lugs 23 provided on the inside of each leg 8 and 9 is provided to limit the outward movement of legs 8 and 9. Suitable pointed ends and flanges are provided on each of the legs 7, 8, and 9 to facilitate anchoring the tripod to the ground. It will be apparent that with the described construction the tripod legs may be collapsed by pivoting the legs parallel to each other and adjacent the bottom of tube 1.

A stock comprising a shoulder rest 24, a pistol grip 25, and a connecting web 76, is welded to the underside of tube 1 near the rear end of the launcher, as shown in Fig. 1. A substantially rectangular opening 26 is provided in the upper forwardly projecting portion 27 of pistol grip 25 to permit the finger of the operator to engage a trigger 28. The trigger 28 is pivotally mounted in a suitable recess in the rear of opening 26 by a transverse pin 29. A light spring 30 is placed in back of trigger 28 to bias trigger 28 outwardly.

A sear mechanism is housed in the upper rear portion of pistol grip 25. A split cocking piece of two mutually pivoted members 31 and 31a is provided. One of the members 31 is provided with a sloped end surface 34. The rear end of cocking piece member 31 is bifurcated and is pivotally secured to an end portion of member 31a by a transverse pin 36. The member 31a is slidably supported in a downwardly projecting bracket 32 which is welded to the underside of tube 1. Another bracket 33 is welded to the underside of tube 1 slightly ahead of bracket 32. Bracket 33 is provided with a slot 35, the bottom of which has a sloped surface 36 which is engaged by the correspondingly sloped end surface 34 of member 31. An integral arm 42 projects rearwardly from the bottom of bracket 33. The sloped forward end 34 of member 31 rests against the sloped surface 36 in bracket 33 when in a cocked position of the mechanism, as shown in Fig. 5. Near the pivoted end of cocking piece member 31 an integral depending lug 37 is provided which has an upwardly sloped surface 38 on the underside thereof. The rear edge of lug 37, as shown in Fig. 5, is engaged by a pivoted sear 39. One end of a helical spring 40 is secured to an integral lug 41 provided on the underside of cocking piece member 31 while the other end of spring 40 is secured to the arm 42 of bracket 33 to bias cocking piece member 31 against the sloped surface 36 in bracket 33.

Sear 39 is pivotally mounted by a transverse pin 43 which is inserted in a suitable transverse hole in a circular bifurcated lug 47, provided on sear 39, and is supported by an upstanding arm 46 on the trigger 28. Sear 39 projects upwardly and engages lug 37. The upper end of sear 39 is provided with a sloped surface 44 which corresponds roughly to the sloped surface 38 of lug 37. An integral arm 45 projects downwardly from sear 39 and engages the upstanding arm 46 on trigger 28. The upstanding arm 46 on trigger 28 rests between the bifurcated portion of lug 47 on sear 39 as shown in Fig. 5. An outwardly projecting arm 48 is provided on sear 39 on which is mounted one end of a sear spring 49 while the other end of sear spring 49 is placed about a stud 50 which is suitably secured to the arm 46 of trigger 28. An integral lug 51 is provided on the underside of the cocking piece member 31a which strikes bracket 32 to limit the rearward movement of cocking piece 31a and 31. The method of operation of the sear mechanism will be described in detail later.

A connecting rod 52 is suitably secured to the rear end of cocking piece member 31a. Connecting rod 52 extends along the underside of tube 1 within a suitable housing 83 within the web 76 of the stock to connect with a hammer sear 53. Sear 53 is slidably mounted in vertical brackets 56 and 57, in housing 83, for movement substantially parallel to the tube 1. A spring 58 surrounds sear 53 between brackets 56 and 57. A washer 59 is secured to sear 53 and against which the spring 58 acts to force the rear end of sear 53 to engage a sear notch 60 in the end of a hammer 54 which is pivotally mounted on a transverse pin 61 supported by the walls of the housing 83. A downwardly projecting integral lug 62 is provided on hammer 54 directly underneath pin 61. Hammer spring 55 is mounted beneath hammer 54, one end thereof engaging a suitable hole in the lug 62 while the other end of spring 55 is passed thru a suitable hole in the end of housing 83 and is secured thereto as by nuts 63. When sear 53 is in engagement with sear notch 60 of hammer 54, the hammer is held in a position substantially parallel to and outside of tube 1. A suitable slot 64 is provided in tube 1 for the passage of the hammer 54 which is adapted to be pivotally forced to an upright position, as shown by the broken lines in Figure 4, by the spring 55 when sear 53 is withdrawn from the sear notch 60 thereby permitting the hammer 54 to strike the primer 65 of an igniter cup 84 of a rocket 66 inserted in tube 1. Hammer 54 may be cocked manually or by the action of the gas jet in a manner to be described.

A rocket positioning detent 67 is provided on the upper surface of a barrel tube 1 to position rocket 66 within the tube 1 in the correct location for firing. The detent 67 comprises a lever arm 68 provided with a depending cone-shaped detent 69. The lever 68 is pivotally mounted by transverse pin 71 in a suitable bracket 70 on top of barrel tube 1. The detent 69 projects through a suitable hole 73 in the wall of tube 1 to engage an annular groove 74 formed in the rocket 66. A biasing spring 75 is placed between the underside of lever 68 and the top of barrel tube 1. If desired a sheet metal deflector 85 (Fig. 1) may be provided on top of tube 1 in position to protect the operator's face from the gas blast of the launched rocket.

The rocket launcher is readily set up in firing position by opening the legs 7, 8 and 9. The leg 7 is set at an appreciable angle towards the rear and the two front legs 8 and 9 are opened to the sides as far as chain 22 will permit. All the legs are forced firmly into the ground. A rocket 66 is inserted into the rear end of tube 1 through the funnel-shaped guide 2 until detent 67 engages the annular groove 74 in rocket 66. Previous to inserting rocket 66 in tube 1, however, the hammer 54, if not cocked should be manually cocked so as not to obstruct insertion of rocket 66 within barrel tube 1. The rocket is fired by pulling trigger 28 to the rear. When trigger 28 is pulled to the rear spring 30 is compressed. Sear 39 is rotated about pin 43 thereby forcing the cocking piece member 31 forwardly. As cocking piece member 31 is pushed forwardly the sloped end 34 of cocking piece member 31 is forced upwardly as it is slid along the sloped surface 36. Cocking piece members 31 and 31a are moved forwardly until hammer sear 53 is disengaged from sear notch 60 thereby releasing hammer 54 to pivot upwardly about pin 61 and strike primer 65 in rocket 66. This effects discharge of rocket 66. Simultaneously with the release of hammer 54 the cocking piece member 31 has been raised sufficiently to move lug 37 out of engagement with sear 39 permitting cocking piece members 31 and 31a to be moved to the rear by spring 53 until lug 51 strikes bracket 32. The bias of spring 40 returns cocking piece member 31 to its proper position so that sloped surface 34 again engages sloped surface 36. The gas blast resulting from the discharge of rocket 66 ejects igniter cup 84 forcibly to the rear whereupon it strikes hammer 54 pivoting hammer 54 downwardly where it is again engaged by hammer sear 53 which has been returned to its cocked position. Sear 39 lies in front of lug 37 as long as trigger 28 remains pulled and the trigger and sear mechanism is ineffective to again cause the release of the hammer 54. However, when trigger 28 is released and brought to its forward position by the bias of spring 30, the sear 39 is rotated against the bias of spring 49 by the interengagement of sloped surfaces 38 and 44 until the sear clears lug 37 and snaps into engagement behind lug 37.

Due to deflector 3 the resultant force of the rocket blast is directed angularly to the ground to a point within the ground area defined by the legs of the tripod. Hence very little recoil force is experienced by the operator. The tripod support being longitudinally adjustable on the tube 1, the operator may readily locate the tripod to achieve maximum stability.

It is thus apparent that a light, easily transportable weapon is hereby provided. The hammer is automatically cocked by the gas blast thereby providing a semi-automatic weapon which requires only the insertion of a new round by the operator to prepare the weapon for firing.

We claim:

1. A firing mechanism for a firearm comprising a pivoted hammer, a hammer spring biasing said hammer, a sear notch on said hammer, a first sear mounted for linear movement, said sear engageable with the said sear notch to hold said hammer in cocked position against the bias of said hammer spring, a sear spring biasing said sear into engagement with said hammer sear notch, a pivoted trigger, a second sear mounted thereon, a sear extension member pivotally connected to said first sear, a lug on said sear extension member engageable by said second sear whereby actuation of said trigger imparts a linear motion to said first sear to disengage said first sear from said hammer sear notch, a cam disposed in the path of movement of said sear extension member, said cam operating to pivot said sear extension out of engagement with said second sear simultaneously with the disengagement of said first sear from said hammer sear notch whereby said first sear and the sear extension member are returned to cocked position by said sear spring.

2. In combination, a rocket having a primer in the rear thereof, a rocket launcher tube for receiving the rocket, means for positioning said rocket within said tube, said tube having an opening, a hammer, means pivotally mounting the same on said tube, said hammer being arranged to pivot through said opening into said tube and strike the primer of said rocket, a spring biasing said hammer in a primer engaging direction, a sear means releasably engaging said hammer for holding the same in cocked position out of the interior of said tube and against the bias of said hammer spring, trigger means for moving said sear means out of engagement with said hammer whereby said hammer is caused to strike said primer, cam means disengaging said sear means from said trigger means, and yieldable means adjacent said sear means for returning the same into position to releasably engage the hammer after the same is pivoted out of said tube to the cocked position by the gas blast of the rocket.

LESLIE A. SKINNER.
JULIUS A. FOLSE.

REFERENCES CITED

The following references are of record in the file of this patent:

UNITED STATES PATENTS

| Number | Name | Date |
| --- | --- | --- |
| 1,147,906 | Swebilius et al. | July 27, 1915 |
| 1,155,061 | Heinemann | Sept. 28, 1915 |
| 1,524,973 | Hazelton | Feb. 3, 1925 |